Nov. 1, 1949. G. H. FRITZINGER 2,486,470
DEVICE FOR DISPENSING AND APPLYING
PRESSURE-SENSITIVE ADHESIVE TAPE
Filed Nov. 13, 1945 4 Sheets-Sheet 1
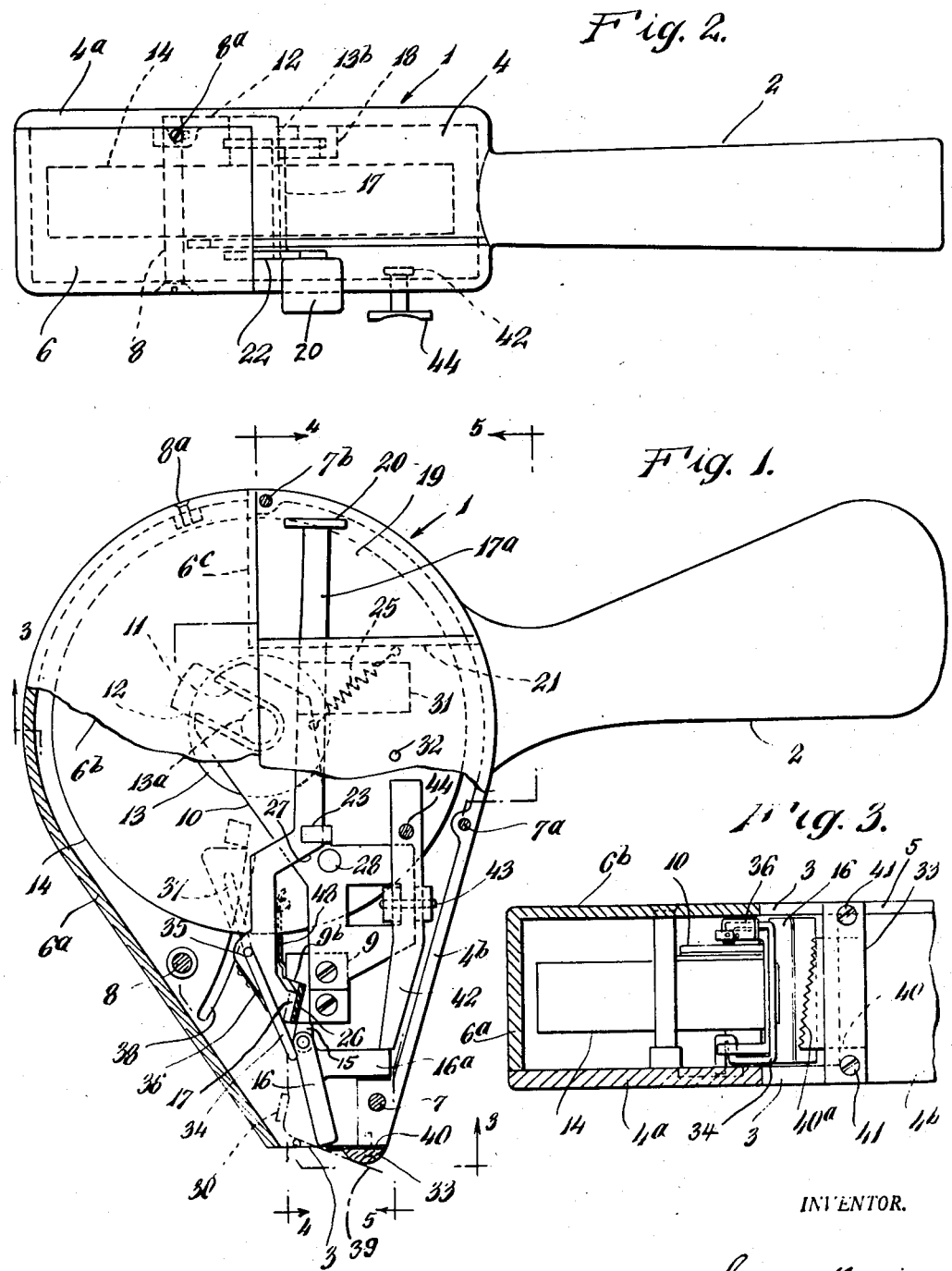
INVENTOR.
George H Fritzinger

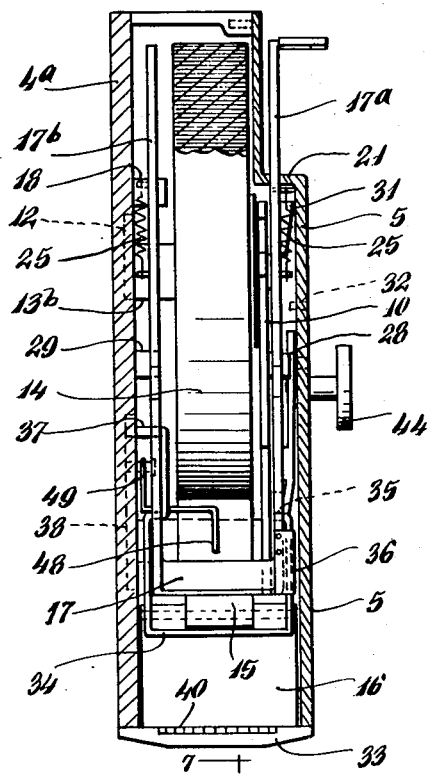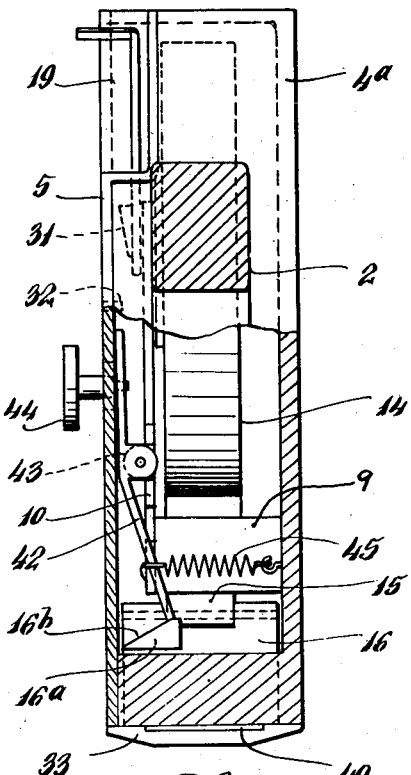

Nov. 1, 1949.　　　　G. H. FRITZINGER　　　2,486,470
DEVICE FOR DISPENSING AND APPLYING
PRESSURE-SENSITIVE ADHESIVE TAPE
Filed Nov. 13, 1945　　　　　　　　　　4 Sheets-Sheet 3
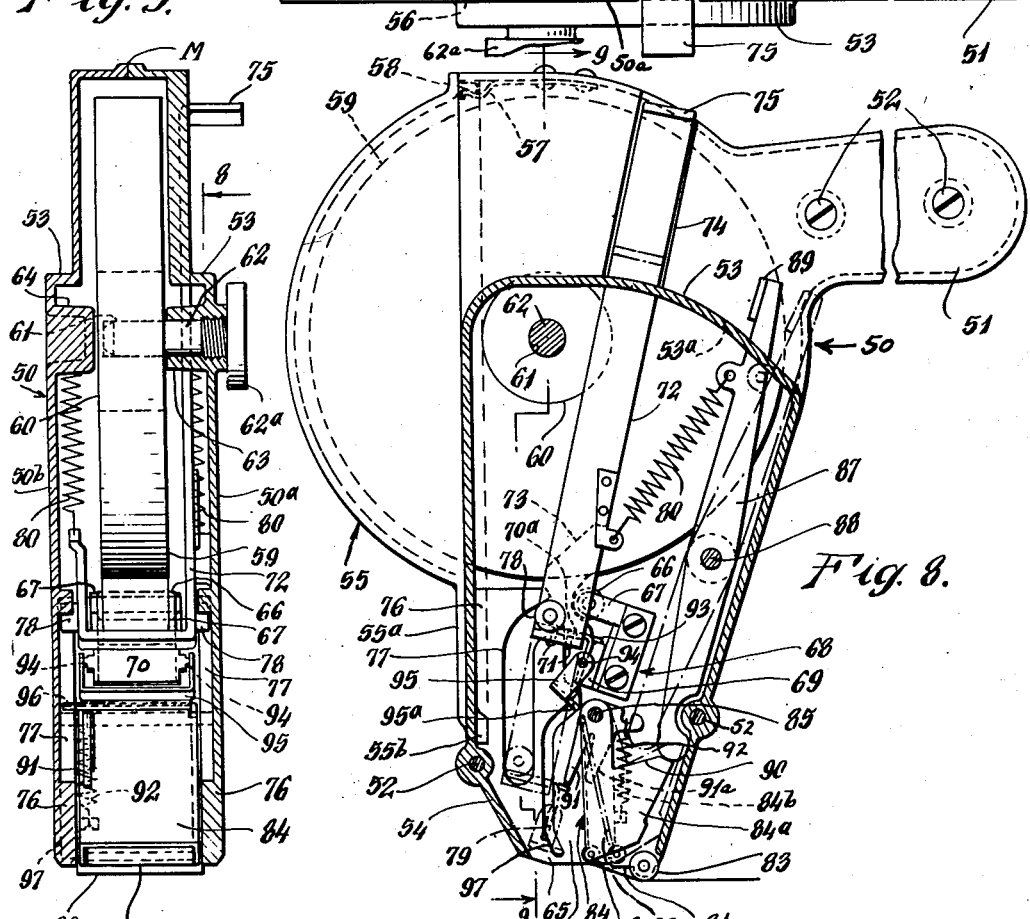
INVENTOR.
George H. Fritzinger Nov. 1, 1949.  G. H. FRITZINGER  2,486,470
DEVICE FOR DISPENSING AND APPLYING
PRESSURE-SENSITIVE ADHESIVE TAPE
Filed Nov. 13, 1945  4 Sheets-Sheet 4
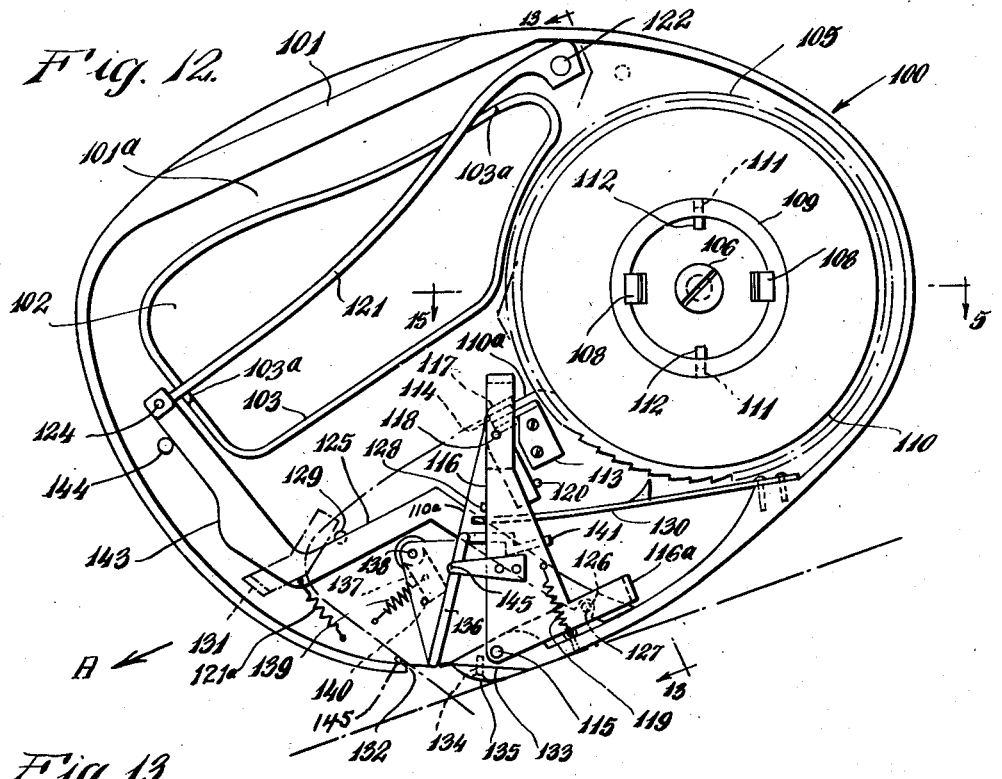
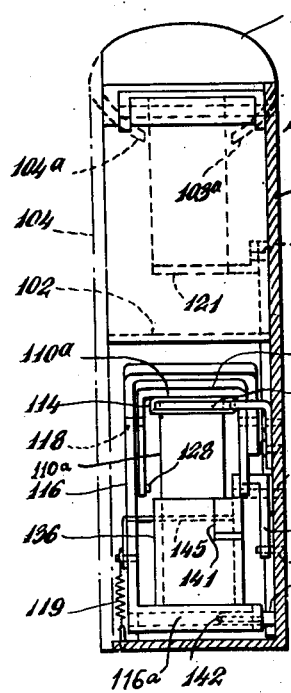
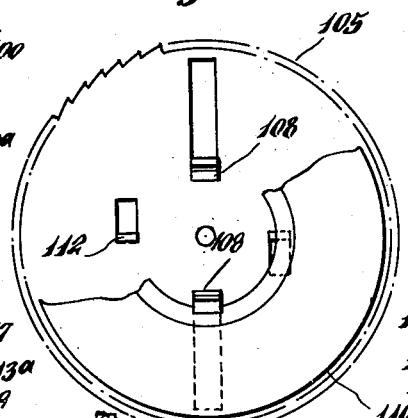
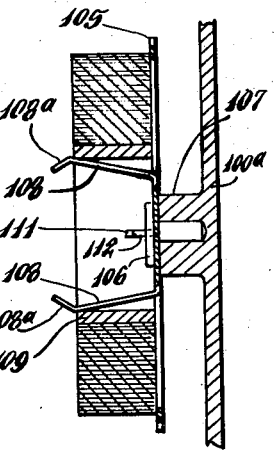
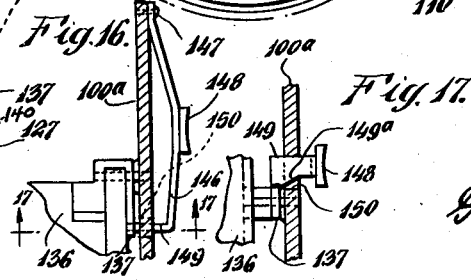
INVENTOR.
George H. Fritzinger Patented Nov. 1, 1949

2,486,470

UNITED STATES PATENT OFFICE 2,486,470

DEVICE FOR DISPENSING AND APPLYING PRESSURE-SENSITIVE ADHESIVE TAPE

George H. Fritzinger, West Orange, N. J., assignor of one-half to Harold G. Kendall, Brooklyn, N. Y.

Application November 13, 1945, Serial No 627,997

20 Claims. (Cl. 216—33)

This invention relates particularly to devices for dispensing and/or applying pressure-sensitive adhesive tape, and more especially to a manipulatable device for applying such tape to objects for packaging, reenforcing, sealing, affixing or other purposes.

Some features of the present illustrative embodiments of my invention are described and claimed in my pending application S. N. 551,769, filed August 29, 1944 (Patent No. 2,401,298, dated June 4, 1946, reissued February 10, 1948, as Re. 22,972), and in the pending application of Harold G. Kendall, S. N. 616,785, filed September 17, 1945, and having common ownership with the present application.

It is an object of my invention to provide devices for the purposes above stated which are dependable in operation and very simple and economical in construction.

It is another object to provide novel and simple means in devices of the character mentioned for feeding a starting length of tape into a dispensing position.

It is another object to provide such novel feeding means which is adapted, when operated, to hold the starting length releasably in dispensing position.

It is another object to provide novel and effective means of simple construction for severing dispensed lengths of tape from the tape supply.

It is another object to provide manual controls for devices of the character mentioned which are so arranged as to assure a positive and dependable operation of the devices with a minimum of control mechanism.

It is a further object to provide an improved device which can be readily manipulated and controlled with one hand to apply pressure-sensitive tape to objects without manually contacting the tape.

It is another object to provide such a device which is suitable for applying lengths of pressure-sensitive tape to thin weak paper, soft packages or other objects which can not stand any substantial pressure or pull thereon.

It is another object to provide a novel device adapted to enable predetermined lengths of pressure-sensitive tape to be dispensed therefrom without having to exert any substantial pull on the tape to draw it from the device.

Other objects are to provide a novel mounting for the tape supply roll in devices of the character mentioned, which is adapted to enable the roll to be mounted in only a correct position and by a single manipulation of the hand, which has no parts that need to be removed temporarily in installing a new roll, and which is adapted to yield to varying inward pressure of the roll, to prevent the roll from warping as in response to varying temperature and humidity.

It is a further object to provide a novel mechanism for feeding out free lengths of pressure-sensitive tape from a supply roll, including novel means for supporting and locking the roll at the end of each feed stroke.

Other objects and features of my invention will more fully appear from the following description and the appended claims.

In the description of my invention reference is had to the accompanying drawings, of which:

Figure 1 is a side elevational view, with parts of the housing broken away, of a device according to my invention for applying pressure-sensitive tape to an object;

Fig. 2 is a top plan view of the device of Figure 1;

Figure 3 is a bottom view of this device taken on the line 3—3 of Figure 1;

Figure 4 is a vertical section taken substantially on the line 4—4 of Figure 1;

Figure 5 is another vertical section taken substantially on the line 5—5 of Figure 1;

Figure 6 is a fractional side-elevational view showing details in the construction of the mechanism for controlling the tape-guiding member; and Figure 7 is a fractional sectional view taken substantially on the line 7—7 of Figure 6;

Figure 8 is a vertical sectional view of a second embodiment of tape applying device according to my invention, taken substantially on the line 8—8 of Figure 9;

Figure 9 is another vertical section of this second embodiment taken substantially on the line 9—9 of Figure 8;

Figures 10 and 11 are top and bottom plan views of this second embodiment;

Figure 12 is a side elevational view, with the side cover removed of a third embodiment of tape applying device;

Figure 13 is a vertical sectional view taken substantially on the line 13—13 of Figure 12;

Figure 14 is a fractional view of the tape roll and mounting means therefor;

Figure 15 is a sectional view of the tape roll and mounting therefor taken substantially on the line 15—15 of Figure 12;

Figure 16 is a fractional sectional view similar to Figure 13 showing a modification of this third embodiment; and Figure 17 is a fractional section on the line 17—17 of Figure 16.

In Figures 1 through 7 I show one embodiment of applying device according to my invention. This device has a housing 1 which, when viewing it from the side, has a semi-circular upper portion from which extends rearwardly a handle 2 and a converging lower portion provided at the bottom with an opening 3 through which the tape is dispensed. This housing may suitably be made in three parts: a main part 4 including the handle 2, the right side wall 4a and a curved back wall 4b extending from the uppermost part of the housing to the opening 3; a partial left side plate 5 which closes the rearward half of the housing; and a cover 6 including the curved front wall 6a and a partial left side wall 6b which cooperates with the left side plate 5 to complete the left side of the housing. The side plate 5 is secured permanently in place by screws 7, 7a and 7b; and the cover 6 is secured temporarily in place by screws 8 and 8a. The cover is to be removed, for example, to permit a new roll of tape to be installed in the device.

The main housing part 4 has an internal laterally extending post 9 in the lower portion thereof to the end face of which is secured by screws a bracket 10 having therein a downwardly and rearwardly inclined slot 11 at the center of the housing. In the right wall 4a there is a corresponding slot 12. These slots receive removably the shaft extensions 13a and 13b on an arbor 13 which forms a core for a tape supply roll 14. Preferably, the slots 11 and 12 have different widths and the shaft extensions 13a and 13b have different diameters to fit the corresponding slots, this being so that the tape roll can be installed in only a correct position—a position wherein, as the tape is drawn downwardly from the roll, the adhesive side thereof will face forwardly in relation to the device. This is one form of unipositional tape-roll mounting arrangement described and claimed in the pending Kendall application abovementioned.

Depending below the post 9 is a lug 15 to which is hinged a plate 16 which extends downwardly to the opening 3. It is downwardly past the front of the post 9 and plate 16 that the tape is drawn from the roll. Among other functions, the post 9 and plate 16 constitute a means for backing the non-adhesive side of the tape.

The means for feeding a starting length of tape through the opening 3 comprises a plunger type feed member 17 having left and right upstanding legs 17a and 17b which straddle the roll 14. This feed member 17 has a flat surface for holding to the tape by adhesive contact. The right leg 17b bears slidably against a notched block 18 provided as an integral part of the housing part 4a and lies wholly within the housing. The left leg 17a extends out of the housing into a side recess 19 thereof. This recess is formed by insetting the side plate 5 at 21, the recess being closed at the front by an inturned wall section 6c of the cover 6 as shown in Figure 1. On the top portion of the leg 17a there is a turned-over lug 20 forming a thumbpiece for actuating the feed member. This leg 17a is guided at the top in a slot 22 provided in the bottom wall 21 of the recess 19, and is held stable against sidewise play at the bottom by a lug 23 turned over from the bracket 10. The feed member is urged upwardly and rearwardly into an initial position—the position it occupies in Figure 1—by tension springs 25 connected between the legs 17a and 17b and the upper rearward part of the housing.

When the feed member 17 is in its initial position it seats in a notch 9b provided in the forward side of the post 9 and bears against the adhesive side of the tape under influence of the springs 25. This notch is bottomed by a resilient pad 26 such as rubber to assure that the feed member will have even contact with the tape.

The pad 26 is hereinafter termed an "anvil" since it backs the tape engaged by the feed member. Upon depressing the feed member the same is initially cammed rearwardly by engagement of the shoulders 27 on the legs 17a and 17b with two similarly placed pins 28 and 29 of which the left pin is mounted on the bracket 10 and the right pin is secured to the right wall 4a. By this camming action the feed member is moved obliquely away from the anvil 26. In the remaining downward movement of the feed member the same takes a path nearly straight downwardly to reach a terminal position indicated by dash-dot lines at 30, which is to the front of the opening 3 as shown in Figure 1. As the feed member is moved downwardly, an inclined latch spring 31 carried thereby is cammed inwardly by a pin 32 on the side plate 5 and snaps underneath this pin when the feed member reaches its terminal position to latch the feed member.

The feed member 17 is inclined from the vertical so that the tape engaging surface thereof is at an angle less than 180 degrees (typically about 165 degrees) from the adhesive side of the tape leading from the feed member to the roll—this being referred to as the feed angle. As is explained in my pending application abovementioned, when the feed angle is less than 180 degrees the feed member grips the tape tenaciously and operates positively to pull the tape from the roll as it is pressed downwardly.

After a new tape roll is installed in the device, a free length of tape from the roll is drawn downwardly between the feed member and anvil 26 to the bottom of the plate 16. The feed member thus initially engages the tape at a distance from the free end thereof. The tape ahead of the feed member constitutes a starting length which is to be initially applied to an object as the device is seated thereon. For pressing the tape against the object there is an applying member 33 on the housing 1 at the rear of the opening 3.

Associated with the feed member 17 is a guide member 34 which is adapted to direct the starting length of tape obliquely through the opening 3 and across the applying member 33 as the feed member is moved downwardly into its operated or terminal position. (The combination of a feed mechanism and a cooperating guide means in advance thereof for use generally in dispensing tape is however not claimed herein but is claimed in my copending divisional application S. N. 79,502, filed March 3, 1949.) This guide member is in the form of a bail pivoted at 35 to the two legs of the feed member. The horizontal part of the guide member is about 5/16" ahead of the feed member and is urged counterclockwise, as it appears in Figure 1, by a spring 36 against the adhesive side of the tape, the guide member having however a contact of very small area, or line contact, with the tape. As the feed member is moved downwardly, a laterally extending arm 37 of the guide member slides in a slot 38 in the housing 1 to turn the guide member counterclockwise and flex the starting length of tape rearwardly with respect to the feed member. Because of this flexing the starting length hugs the plate 16 and applying member 33 as it is fed out into a dispensing position, reaching the position 39 indicated by dash dot lines in Figure 1.

Beneath the plate 16 there is a horizontal blade 40 having an inclined cutting edge 40a, preferably serrated as shown in Figure 3, that faces forwardly toward the opening 3. This blade is clamped between the applying member 33 and the housing 1 by a pair of screws 41 shown in Figure 3. When the device is seated on an object and then moved forwardly to apply a length of tape thereto, the tape is first pulled free from the guide member and stripped from the feed member; thereafter, the tape is pulled slidingly against the plate 16. Normally this plate is latched in the forward position it occupies in the figures by engagement of a pawl 42 with a rearwardly extending arm 16a of the lever. In this forward position the plate serves as a guard to withhold the tape from the blade so that any desired length of tape can be drawn from the device and applied to an object.

The pawl 42 is pivoted at 43 to a pair of lugs turned over from the bracket 10 and has a thumbpiece 44 secured to the upper end portion thereof, which extends leftwardly through an opening in the side plate 5 of the housing. The pawl is biased counterclockwise (as it appears in Figure 5) in its latching position by a tension spring 45. The upper face 16b of the arm 16a slopes downwardly to the left so that when the thumbpiece 44 is pressed inwardly the pawl 42 is freed from the guard plate and the latter is unlatched. Thus, upon drawing the tape across the applying member 33 while the thumbpiece 44 is pressed inwardly, the guard plate will be moved rearwardly by the tape and the tape will be pulled almost parallel with the blade 40 against the cutting edge thereof, causing the tape to be readily severed. Therefore, simply by releasing the guard plate while continuing to draw tape from the device, the operator may sever the tape as desired. Upon releasing the thumbpiece 44, the same is returned by the spring 45 to cam the guard plate forwardly into its effective position.

It is desirable that the feed member be returned to initial position as the tape is severed but before the severing is completed—i. e., while the tape is taut against the guard lever. Accordingly, I unlatch the feed member from its operated position as the thumbpiece 44 is initially pressed inwardly, this unlatching being effected by the upper part of the pawl 42 engaging the latch spring 31 and disengaging the latter from the pin 32. As soon as the feed member is unlatched, it is snapped back to initial position by the springs 25.

During the return stroke of the feed member the guide member 34 is held spaced from the guard lever so that it will not contact the tape until the feed member reaches its initial position. For this purpose, the upper part of the slot 38 is widened and a cam spring 46 is mounted therein which cams the guide member clockwise during the final portion of the return stroke as will appear from Figures 6 and 7. As the feed member nears its initial position the arm 37 of the guide member enters a slot 47 in this cam spring whereupon the guide member is snapped counterclockwise against the tape by the spring 36. In the forward stroke of the feed member, it will be understood that the arm 37 moves past the tip of the cam spring 46, flexing it away from the wall of the slot 38, and enters then into the narrow lower portion of this slot.

Pressing lightly against the forward side of the post 9 is a spring finger 48 which is anchored to the wall 4a at 49. This finger has a point contact with the adhesive side of the tape and is provided as a safety member for holding the free tape length in place should the tape be accidentally severed before the feed member is returned to initial position.

In Figures 8 to 11 inclusive I show a revised form of my first embodiment above described, which is designed for maximum economy in manufacturing and maximum dependability in operation. This embodiment has a housing 50 provided with a handle 51 which extends rearwardly with respect to the direction of movement of the device across an object. The housing is split at its medial plane M (see Figure 10) into two similar left and right sections 50a and 50b which are secured together by four screws 52 with inset heads of which two are at the bottom of the housing and two are in the handle 51. The side walls of the housing are offset at 53 so that the top portion of the housing has a reduced thickness, this thickness being the same as that of the handle 51. The housing has a lower end wall section 54 at the front, but upwardly from this wall section the housing is open. Engaging this opening of the housing is a cover 55. This cover comprises a hollow semi-circular portion provided with a flat depending section 55a. The rim of the cover is shouldered at 56 (see Figure 10) so that it will fit into the opening of the housing and seat thereagainst. The lower cover section has an inset lip 55b at the bottom which hooks on the wall 54. At the top the cover is held releasably in place by a spring clip 57 on the housing which engages a notch 58 in the cover.

In the upper portion of the housing there is a tape roll 59 the front portion of which lies within the cover 55. This roll has a central core 60 provided at its axis with a circular hole 61, that extends through the major length of the core, the hole being at the end of the roll at which the tape convolutions run counterclockwise going from the outer to the inner portions of the roll. This hole is engaged by a journal stud 62 which threads through a boss 63 in the left wall of the housing, the stud having a head 62a to permit it to be easily removed and installed. The roll is located laterally between the boss 63 and a boss 64 on the right wall of the housing. By this mounting arrangement the roll can be installed in only a correct position wherein as the tape is drawn downwardly from the roll the adhesive side of the tape will face to the front. This mounting arrangement is claimed broadly in the pending Kendall application abovementioned.

The housing has a bottom opening 65 through which the tape is dispensed and drawn from the device. The tape drawn from the roll passes first across a roller 66 which is journalled between two lugs 67 of a bracket 68 held by screws to the right wall of the housing. Secured to this bracket is a resilient pad 69 which forms an anvil for backing the non-adhesive side of the tape. Engaging the adhesive side of the tape backed by this anvil is a feed member 70 for pulling a starting length of tape from the roll. This feed member has a shank 70a bent forwardly and secured to a plunger 72. The lower portion of the plunger is U-shaped and straddles the lower portion of the roll when the plunger is in its initial —i.e., uppermost—position shown in Figure 8. The right leg of the plunger terminates at the line 73 shown in Figure 8 and the left leg thereof extends upwardly through a slot 74 in the top inset wall portion of the left housing section 50a, this left leg terminating in a turned-over lug which forms a thumbpiece 75. It is to the horizontal lower cross portion of the plunger that the feed member 70 is secured as by rivets 71.

The side walls of the housing below the tape roll have portions 76 of increased thickness in which are provided respectively two guide slots 77. Journalled to the lower portion of the plunger at the sides thereof are rollers 78 which engage these slots, the rollers being at the upper ends of the slots when the plunger is in its initial position. In going from top to bottom, the slots curve forwardly and then extend straight downwardly so as to guide the feed member obliquely away from the anvil 69 into the terminal position 79 indicated by dash dot lines in Figure 8. The plunger is urged upwardly and rearwardly of the housing by two tension springs 80 connected to the legs thereof. When the plunger is released from an operated position these springs return it to its initial position and serve there to press the feed member against the adhesive side of the tape backed by the anvil 69.

At the rear of the opening 65 there is a stationary blade 81 secured by screws 82 against the bottom of the housing. This blade has the shank portion thereof cut away at 81a to provide space for a roller 83 having trunnions at its ends which journal in the side walls of the housing. This roller constitutes an applying means for pressing the tape, which is drawn from the device, into contact with an object as the device is rolled thereacross.

Above and to the front of the cutting edge of the blade 81 there is a guard plate 84 which spans the width of the opening 65 and has turned-back side portions 84a and 84b pivoted on a cross rod 85 supported at its ends by the side walls of the housing. At the lower end of this guard there is a roller 86 having trunnions journalled in the sides 84a and 84b of the guard. The left side 84a of the guard extends rearwardly to the back wall of the housing. Overlying this side 84a is a detent lever 87 pivoted at 88 to an interior boss 88a on the left wall of the housing. This detent lever extends upwardly through an opening 53a in the left housing section and terminates in a thumbpiece 89 which is below and to the rear of the thumbpiece 75 for the feed member. The leftward one of the springs 80 abovementioned connects to the upper end portion of this detent lever and urges the lever counterclockwise into an effective position defined by the abutment of the lower end thereof against the back wall of the housing. In this position the detent lever lies directly above the rearward end of the side 84a of the guard and latches the guard in an effective position wherein the guard serves to withhold the tape from the blade as the tape is drawn from the device across the roller 83. When the thumbpiece 89 is pressed rearwardly the detent lever registers with a notch 90 in the guard side 84a to free the guard so that it may be moved rearwardly to an ineffective position 99 shown by dash dot lines in Figure 8.

The guard 84 has a slit adjacent its right side in which there is a latch lever 91 for the plunger 72, which is pivoted on the cross rod 85. This latch lever is biased forwardly relative to the guard in a position defined by the abutment of a depending leg 91a of the lever against the back side of the guard, the biasing being effected by a tension spring 92 connected between a rearward arm of the lever and a lug on the guard as shown in Figure 8. Extending rearwardly from the right side of the feed member 70 is lug 93. As the plunger 72 is depressed this lug engages the latch lever 91 and cams it rearwardly, and then the latch lever snaps over the lug and latches automatically the feed member in its terminal position.

Extending laterally from opposite sides of the feed member 70 are ears 94 on which is pivoted a depending U-shaped guide lever 95. This guide lever has a rearwardly extending portion 95a which has a line contact with the adhesive side of the tape at a distance, say $\frac{1}{16}$ inch, ahead of the feed member. On the right side of the guide member there is a laterally extending ear 96 which engages a guide slot 97 provided in the thickened portion 76 of the right wall of the housing. As the plunger 72 is depressed the ear 96 slides downwardly through the slot 97 and turns the guide lever rearwardly with respect to the feed member so as to guide the starting length of tape obliquely through the opening 65 and across the applying roller 83.

To put the device in condition for operation after installing a new roll of tape, the user will press the thumbpiece 75 to latch the plunger 72 in operated position and clear a path from the tape roll to the opening 65. The user then passes a length of tape from the roll through this path to the opening 65, or alternatively he may project it through this opening in which case he will next pull the projecting tape against the guard 84 while depressing the thumbpiece 89 to release the guard so that the tape will be pulled against the blade and be severed. As the guard is moved to ineffective position by the tape the latch lever 91 is disengaged from the lug 93 whereupon the springs 80 return the feed member 70 to initial position. (Since the user has to depress the thumbpiece 89 in order to sever the tape, and the plunger 72 is adapted to be operated also by the thumb, he is prevented from accidentally interfering with the automatic return of the feed member to initial position as the tape is severed.) The device is now ready for use, as follows.

When a length of tape is to be applied to an object, the thumbpiece 75 is depressed until the plunger 72 is latched. As this is done the feed member retains a hold on the tape at a feed angle of less than 180 degrees and pulls a length of tape from the roll. At the same time the guide lever is turned counterclockwise to flex the starting length of tape which is ahead of the feed member in a rearward direction and keep it closely adjacent the guard roller 86 as it is fed out of the device, the guide slot 97 being for this purpose curved more sharply downwardly at the top than the guide slots 77 for the feed member and being sharply curved rearwardly at the bottom as shown in Figure 8. After the starting length is so fed out in a dispensing position the device is seated on an object and rolled forwardly thereacross to apply a length of tape thereto. In order that the tape may be so applied with a minimum pull on the tape there are provided the rollers 66, 86 and 83 as abovedescribed. When the desired length of tape is applied, the thumbpiece 89 is depressed and the device is moved further forwardly to sever the tape and return the feed member to initial position as above explained. To facilitate this severing a pointed blade is preferably used so that it will first puncture the tape and cause the tape to tear off easily as described in the aforementioned pending Kendall application. In this embodiment, only when the guard is moved to ineffective position is the feed member returned. This mode of controlling the return of the feed member assures that the tape will be taut against the guard as the feed member is returned and assures against a premature engagement of the feed and guide members with the tape such as might foul the operation of the device.

In Figures 12 to 17 inclusive I show a third embodiment of my invention which is adapted for applying pressure-sensitive tape to weak thin sheets, for sealing packages wrapped with thin paper such as tissue paper, etc. Some of the pressure-sensitive tapes have such strong adherence to the tape supply roll that weak thin paper is not strong enough to withstand the force necessary to draw the tape from the roll and tends thus to buckle and tear as the tape is applied thereto. This embodiment is adapted to draw off a free slack length of tape from the roll and make it available in a dispensing position so that it can be applied to an object without exerting any substantial pull on the tape.

This applying device comprises a housing 100 having a uniform thickness and a generally oval shape as viewed from the side. The housing has a handle 101 at the top below which there is an opening 102 to clear the fingers of the hand as the handle is gripped. The opening 102 is surrounded by an interior wall 103 of the housing. The right side of the housing—the side facing the reader in Figure 12—is closed by a removable cover plate 104 shown by dash dot lines in Figure 13. At the top of this cover plate there is an inwardly curved section 104a which constitutes part of the inner wall of the handle 101.

In one end portion of the housing there is a disk form of ratchet wheel 105 journalled on a stud 106 which is threaded in an interior boss 107 of the housing. This ratchet wheel carries two diametrically opposite arms 108 which are bent-over portions of the ratchet wheel. When the arms are made integral with the ratchet wheel as described, the latter is made of a spring material, say Phosphor bronze, so that the arms will have a substantial resilience. These arms flair outwardly but have inwardly curved end portions 108a, so that they will engage the annular core piece 109 of a standard roll of pressure-sensitive tape and retain the roll in mounted position, upon simply pressing the core piece axially against the ratchet wheel. The tape roll is to be mounted with the winding running counterclockwise from the outer to the inner portions of the roll as viewed in Figure 12, so that as the tape 110a is drawn downwardly from the roll the adhesive side thereof will face in the direction in which the device is to be moved across an object, the direction indicated by the arrow A in Figure 12. In order to prevent the user from mounting the roll with the wrong side facing the ratchet wheel, as well as installing a roll which may not be suitable for use in the device, I provide the core piece 109 of each roll to be used in the device with one or more slits 111, preferably two in diametrically opposite positions, at the ends of the roll at which the tape winding runs clockwise going from the outer to the inner portions of the roll, and I turn over from the ratchet wheel 105 two locating lugs 112, preferably at 90 degrees from the arms 108, which are adapted to engage these slits of the core piece when the roll is properly mounted. These lugs have a length such that should the user attempt to install a roll in the wrong position the lugs will prevent the roll from being pressed against the ratchet wheel and the arms 108 from effectively engaging the core piece. Additionally, the lugs 112 serve to lock rotatably the roll to the ratchet wheel, which is advantageous in the present embodiment as will hereinafter appear.

Secured to the right side wall 100a of the housing, near the center thereof, is a bracket 113 having a platform 113a spaced from the wall 100a and extending radially from the tape roll 110. This platform is covered by a resilient pad 114 which may be part of a rubber band stretched around the platform as shown. This pad constitutes an anvil which backs the non-adhesive side of the tape 110a drawn from the roll. Pivoted at 115 to the lower portion of the housing is a lever 116. In its initial position shown in Figure 12, this lever extends upwardly to the right of the anvil 114, then laterally across the anvil at a short distance thereabove and next downwardly for a short distance between the anvil and wall 100a. Straddling the anvil is an inverted U-shaped feed member 117 which is pivoted below the anvil at 118 to the lever 116. Under influence of a tension spring 119 which urges the lever 116 clockwise as it appears in Figure 12, the feed member engages the adhesive side of the tape backed by the anvil, the engaging face of the feed member being held parallel to the top face of the anvil by the contact of the left leg of the feed member with a pin 120 on the housing wall 100a.

The lever 116 is operated by a manual lever 121 which spans the opening 102 from front to back and is pivoted at 122 to the housing, there being a slit 103a in the wall 103 through which the lever extends. Pivoted at 124 to the free end of the manual lever is a link 125 which extends downwardly along the wall 100a and terminates between this wall and a U-shaped lower part 116a of the lever 116. This lower portion of the link has a slot 126 in the lower end portion thereof to form a catch for engaging a stud 127 on the lever part 116a.

As the handle is gripped by the hand the manual lever is swung upwardly into an open space 101a within the handle, and in response thereto the lever 116 is turned by the link 125 counterclockwise (as it appears in Figure 12) through an angle of approximately 70 degrees. In the initial counterclockwise movement of the lever 116 the feed member is turned clockwise by the resisting feed force of the tape until the right leg thereof abuts against a lug 128 turned over from the lever 116. By this clockwise movement of the feed member, the angle between the engaging face thereof and the adhesive side of the tape leading to the roll—herein termed the feed angle—is reduced to less than 180 degrees and the feed member therefore has a tenacious grip to the tape. Certain features of this feed mechanism are not claimed herein but are claimed in my pending application S. N. 760,283, filed July 11, 1947, entitled "Tape feeding and severing." Near the end of the feed stroke the left leg of the feed member hits against a pin 129 on the wall 100a and is tripped—i. e., turned clockwise to increase the feed angle to more than 180 degrees. The feed member has now a weak hold to the tape. In the final portion of the feed stroke immediately following the tripping of the feed member the part 116a of the lever 116 presses against a detent pawl 130 and latches the ratchet wheel 105. The tape is thus positively stripped from the feed member as it is moved into its terminal position 131 shown by dash dot lines in Figure 12. This feature of locking the tape supply roll during the latter part of the feed stroke, which is to assure positively the release of the tape from the feed member during the latter part of each feed stroke regardless of how tenaciously the tape may be held by the feed member, is claimed in my pending U. S. patent application, Serial No. 635,890, filed December 19, 1945.

The tape is dispensed through a bottom opening 132 in the housing, which is to the front of the pivot 115 with respect to the direction of movement of the device. At the rear of the opening there is a blade 133 and clamped against the rearward part of the blade by screws 134 is a flat iron 135 for applying the dispensed tape to an object. Leading from the front of the blade towards the anvil 114 is a guard plate 136 which has an arm 137 turned over from the side thereof pivoted at 138 to the wall 100a. This guard plate is biased lightly by a tension spring 139 into an effective position defined by contact of the arm 137 with a pin 140—the position it occupies in Figure 12—wherein it serves to withhold the tape from the blade 133. Extending from the top part of the guard is a catch 141 which snaps over a roller 142 on the inner end of the stud 127 to latch the lever 116 in an operated position.

The catch 141 engages the roller 142 before the manual lever 121 reaches a fully operated position. In the final movement of this manual lever a cam 143 on the link 125 engages a pin 144 on the housing and releases the link from the stud 126. The lever 121 is thus uncoupled from the lever 116 so long as a tight grip is retained on the handle.

After the roll 110 is first installed in the device the lever 116 is latched in its operated position and a free length 110a of the tape is drawn across the anvil 114 and downwardly across the guard plate 136 and through the opening 132. Next, while the handle is being gripped, the tape is drawn from the device against the guard plate so as to unlatch the lever 116 and pull the tape against the blade 133 and be severed. When the lever 116 is unlatched it is returned by the spring 119 to engage the feed member with the tape backed by the anvil 114. At the same time a spring guide finger 145 on the lever 116 engages the adhesive side of the tape on a line at a short distance from the free end thereof and retains the tape against the guard plate. When the lever 121 is released, it is returned to initial position by a spring 121a connected to the link 125. As the lever 121 is so returned, the end of the link is cammed over the stud 127 and then, when the slot 126 registers with the stud, the link is snapped by the spring 121a into engagement with the stud.

When the handle 101 is next gripped and the lever 121 is operated, a length of tape is pulled from the roll, the feed member is released therefrom and the lever 116 is then latched in its operated position. At the same time an end portion—i. e., starting length—of the tape is carried by the guide finger 145 on an arc through the opening 132. At the end of the feed stroke there is thus a curled free slack length of tape stored in the free forward space of the housing and extending through the opening 132, which is held in place only by the guide finger 145. Upon seating the device on an object the starting length is applied thereto and upon next moving the device across the object this free length is drawn from the device, the only resisting force on the tape being that to break the line contact of the tape with the guide finger. When this free length is drawn out, a slight pull on the tape will move the guard back to ineffective position, causing the tape to be drawn against the blade and be severed.

In Figures 16 and 17 there is shown a manually releasable latch for the guard plate 136, which is adapted to enable any desired length of tape to be drawn from the device as in the first two embodiments hereinbefore described. This latch comprises a leaf spring 146 secured at 147 to the wall 100a at the left side of the housing. The spring has a push button 148 mounted thereon and has an inwardly turned lug 149 which extends through an opening 150 in the housing, this lug lying just counterclockwise of the arm 137 of the guard plate. In its outer normal position the spring latches the guard in effective position. When the spring is depressed, however, it clears the arm 137 and allows the guard plate to be moved by the tape to ineffective position. When the spring is next released an inclined face 149a of the lug 149 engages the arm 137 and cams the guard plate into its effective position. With the addition of this spring latch the user will press the push button 148 in as he moves the device across an object if he wants to apply only a free length of tape without feed resistance. If, however, he wants to apply a longer length he will leave the push button released and press it when he wants to sever the tape.

It is apparent that one may hold any one of the above-disclosed embodiments as in one hand, grip the starting length of tape by the fingers of the other hand and, if desired, pull out any selected length of tape and then press the cut-off lever to sever the length of tape from the tape supply roll whereby to use the device strictly as a tape dispenser.

I have herein described certain preferred embodiments of my invention but it will be understood that these embodiments are intended to be illustrative and not necessarily limitative of my invention as the same are subject to changes and modifications without departure from the scope of my invention, which I endeavor to express according to the following claims.

I claim:

1. In a manual device for applying pressure-sensitive tape to objects including a housing for a tape supply roll, an exterior applying means for pressing tape into contact with said objects and an opening in said housing adjacent said applying means: the combination of a tape-feed member having a surface for holding to the tape by adhesive contact, said feed member having an initial position wherein it engages the tape at a distance from the free end thereof; means for moving said feed member towards said opening to pull tape from said roll; and a member contacting the adhesive side of the tape ahead of said feed member and moved transversely of the latter as the feed member is advanced for guiding the free end portion of the tape obliquely through said opening in a sidewise direction across said applying means with the adhesive side of the tape facing outwardly relative to said housing.

2. In a device for applying pressure-sensitive tape to objects including a frame, a tape-applying means on said frame, and a support on said frame for a supply roll of tape: the combination of a feed member movably mounted on said frame having a surface for holding to the tape by adhesive contact, said feed member having an initial position wherein it engages the adhesive side of the tape at a distance from the free end thereof; means for moving said feed member towards said applying means while maintaining the engaging surface of the feed member at a feed angle of substantially 180 degrees or less from the adhesive side of the tape leading from the feed member toward said roll; a guide member pivoted to said feed member and having a limited surface for contacting the adhesive side of an intermediate portion of the tape ahead of said feed member; and means effective upon actuating said feed member for moving said guide member to direct the tape across said applying means with the adhesive side of the tape facing away from said applying means.

3. A device for applying pressure-sensitive tape to objects including a tape-applying means for pressing tape into contact with an object and a support for a tape supply roll: the combination of means for backing the non-adhesive side of the tape drawn from said roll, said backing means terminating adjacent said applying means; a feed member having an initial position wherein it bears against said backing means and engages the adhesive side of the tape at a distance from the free end thereof; means for advancing said feed member obliquely away from said backing means and returning the same to initial position; a guide member carried with said feed member and moved transversely of the path thereof towards said backing means as the feed member is advanced for engaging the adhesive side of the tape ahead of the feed member and directing the tape across said applying means with the adhesive side of the tape facing away therefrom; and means effective as said feed member is returned to initial position for retracting said guide member from said backing means.

4. In a device for dispensing lengths of pressure-sensitive tape from a tape roll: the combination of a feed member having a surface for holding to the tape by adhesive contact, said feed member having an initial position wherein it engages the adhesive side of the tape at a distance from the free end thereof; means for advancing said feed member while maintaining said surface at a feed angle of less than 180° from the tape leading therefrom to the roll whereby to pull a length of tape from the roll; means for severing the tape ahead of said feed member; and means operatively associated with said severing means and effective upon the severing of said tape for returning said feed member to initial position.

5. In a device for dispensing lengths of tape from a supply roll: the combination of a tape-severing means; a guard held normally stationary in position wherein it is effective to prevent the tape as it is drawn from said roll against the guard from engaging said severing means; and means for rendering said guard ineffective.

6. A controllable device for severing tape as it is drawn along a predetermined path from a supply roll against a resisting force comprising a blade, a movably mounted guard member adjacent to said blade and against which the tape is pulled as it is drawn from said roll, said guard member being latchable in an effective position wherein it serves to withhold the tape from said blade and being movable to an ineffective position, and means for releasing said guard member to render the same responsive to the pressure of the tape thereagainst whereby as the tape is pulled from said roll the guard member is moved to said ineffective position and the tape is drawn against said blade and is severed.

7. In apparatus including a supply roll of tape: the combination of a movably mounted guard member partially around which the tape is pulled as it is drawn from said roll, a blade adjacent to said guard member movably mounted, means for latching said guard in position wherein it is effective positively to withhold the tape from said blade, means biasing said latching means into effective position, and means connected to said latching means and operable against the force of said biasing means to move the latching means out of the path of said guard member to free the guard member for retraction relative to said blade by said tape as the tape is drawn from said roll whereby the tape is pulled against said blade and is severed.

8. In apparatus including a supply roll from which tape is drawn against a feed resisting force: the combination of means partially around which the tape is pulled and defining a curved path for the tape having portions substantially at right angles to one another, a blade having a cutting edge adjacent to the apex of said curved path and toward which the tape is pulled as it is drawn from said roll, means mounting said defining means for shifting movement with respect to said blade to cause the blade to intersect the path of the tape, and means operable to cause said shifting movement of said defining means with respect to said blade whereby the tape upon tensioning thereof is pulled against said blade and is severed.

9. In a device for dispensing lengths of pressure-sensitive tape from a supply roll and applying the tape to objects: the combination of an applying means for pressing the tape against an object, a fixedly mounted blade having a cutting edge adjacent to said applying means and towards which the tape is pulled as it is drawn from said device and applied to an object, a movably mounted guard for withholding the tape from said blade, means for latching said guard in an effective position, and manual means for releasing said latching means.

10. In a device for dispensing pressure-sensitive adhesive tape from a supply roll: the combination of a reciprocable feed means for pulling successive starting lengths of tape from said roll, said feed means being biased into an initial position; a fixedly mounted tape-severing blade; a movable guard having an effective position wherein it serves to withhold the tape from said blade as the tape is drawn from said roll; means for releasably holding said feed means in operated position; means for releasably holding said guard in effective position; and common means for releasing simultaneously both said holding means.

11. In a device for dispensing adhesive tape from a supply roll: the combination of feed means actuatable from initial position for pulling a starting length of tape from said roll, a tape severing means, a guard for withholding the tape from said severing means as the tape is dispensed, said guard and severing means being mounted for relative movement, means for relatively holding said severing means and guard in positions to render said guard normally effective, and means controlled by said holding means for returning said feed means to initial position.

12. In a device for dispensing pressure-sensitive tape from a tape roll and applying the same to objects: the combination of a reciprocable feed means actuatable to pull a starting length of tape from said roll; means biasing said feed means into initial position; means for latching said feed means in operated position; a tape-severing means; a guard for withholding the tape from said severing means as the tape is drawn from said device; means for rendering said guard ineffective; and means coupled to said last-stated means and operated as an incident precedent to rendering said guard ineffective for releasing said latching means for said feed means.

13. In a device for dispensing adhesive tape from a supply roll: the combination of a reciprocable feed means for pulling successive starting lengths from said roll, said feed means being biased into an initial position; a fixedly mounted tape-severing blade; a movable guard having an effective position wherein it withholds the tape from said blade as the tape is drawn from said roll; means for holding said guard in effective position; releasable means for holding said feed means in operated position; and means, controlled by said guard, for releasing said holding means as said guard is moved to ineffective position.

14. In a device for dispensing lengths of pressure-sensitive adhesive tape from a tape roll and applying the tape to objects: the combination of a feed member having a surface for releasably holding to the tape by adhesive contact, said feed member having an initial position wherein it engages the tape at a distance from the free end thereof; means for moving said feed member to an operated position to pull a length of tape from said roll; a blade; a guard for withholding the tape from said blade as said starting length is drawn from said device; means operable to cause said guard to be rendered ineffective; and means, controlled by said last-stated means, for returning said feed member to initial position as said guard is rendered ineffective.

15. In a manual device for applying pressure-sensitive adhesive tape to objects, including a tape roll: the combination of reciprocable means for feeding successive starting lengths of tape from said roll; means for severing said tape; a first manual control member connected to said feeding means for actuating the latter; a second manual control member for placing said severing means in effective and ineffective conditions; means operative automatically to latch said first control member when the same reaches an operated position; and means, controlled by said second control member, for returning said first control member to initial position as said severing means is put into operation.

16. In a manual device for dispensing pressure-sensitive adhesive tape from a tape roll and applying the same to an object including a housing provided with a handle: the combination of a feed means movable from initial position to pull a starting length of tape from said roll; a first control member for said feeding means; a tape-severing means; a second control member for said severing means; and means, controlled by said second control member, for returning said feed means to initial position, said control member being adjacent said handle in positions for operation by the same digit of the hand while said handle is gripped thereby.

17. In a device including a supply roll of pressure-sensitive tape and a housing having an opening through which the tape is dispensed: the combination of means for pulling a free slack length of tape from said roll and thereupon releasing itself from the tape; directing means for projecting an end portion of said free length through said opening to permit said free length to be drawn from said housing; and means, responsive to drawing said free length from said housing and pulling the tape from said roll in a taut condition, for severing the tape.

18. The combination set forth in claim 17 including controllable means for rendering said severing means ineffective whereby to permit varying lengths of tape to be dispensed from said device.

19. In a device for dispensing lengths of tape from a supply roll: the combination of a blade for severing the tape; means normally effective for defining a path of the tape free from said blade as the tape is pulled in a predetermined direction from said device; means mounting said defining means for movement by pressure of the tape thereagainst; and means, coupled to said defining means and controlling the relative positioning of said defining means and blade, said last-stated means being operable to cause said blade to intersect the path of the tape in response to a pulling force exerted on the tape in said predetermined direction.

20. The apparatus set forth in claim 7, wherein said guard member is in an unbiased condition, including an operative coupling between said latching means and said guard member effective to return the guard member to effective position as the latching means is returned to effective position.

GEORGE H. FRITZINGER.

REFERENCES CITED

The following references are of record in the file of this patent:

UNITED STATES PATENTS

| Number | Name | Date |
| --- | --- | --- |
| 164,925 | Longley | June 29, 1875 |
| 2,100,462 | Shimer | Nov. 30, 1937 |
| 2,100,652 | Shimer | Nov. 30, 1937 |
| 2,236,993 | Crebbs | Apr. 1, 1941 |
| 2,260,489 | Sim | Oct. 28, 1941 |
| 2,264,425 | Witter | Dec. 2, 1941 |
| 2,324,349 | Atkins | July 13, 1943 |
| 2,352,445 | Pinckney | June 27, 1944 |
| 2,364,051 | Berridge | Dec. 5, 1944 |